UNITED STATES PATENT OFFICE.

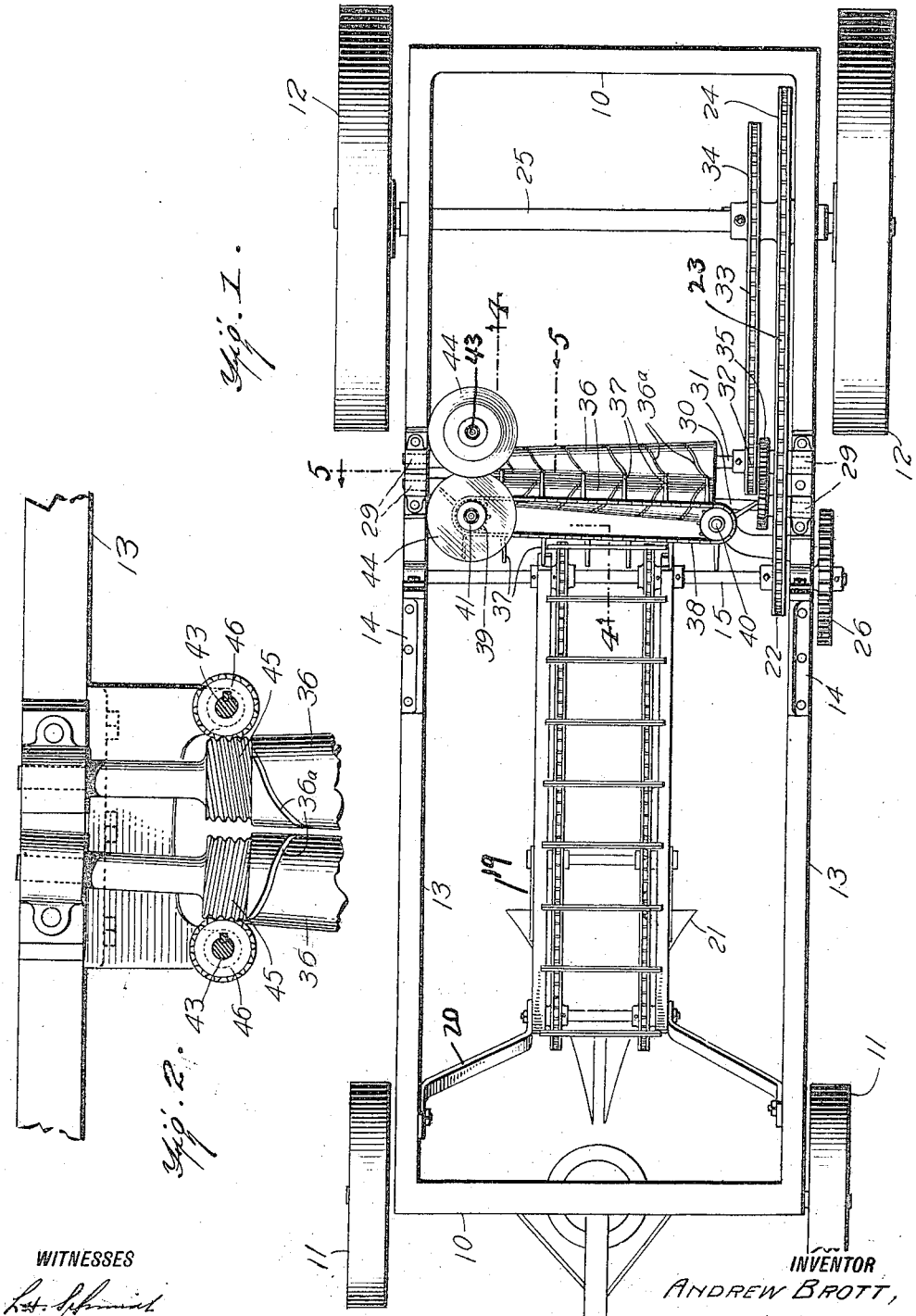

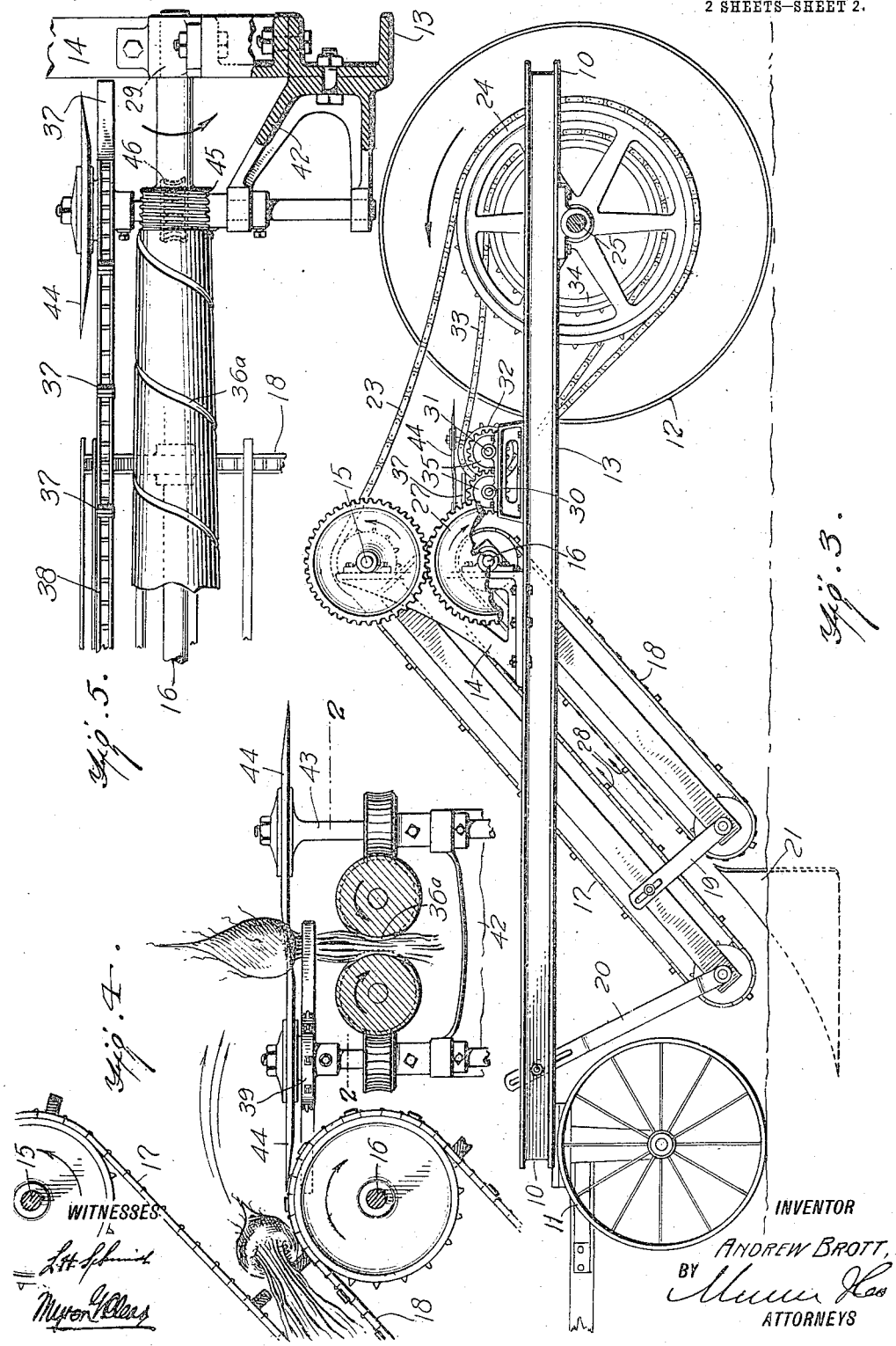

ANDREW BROTT, OF SIDNEY, NEBRASKA.

BEET-HARVESTING MACHINE.

1,252,230.  Specification of Letters Patent.  Patented Jan. 1, 1918.

Application filed November 17, 1916. Serial No. 131,882.

*To all whom it may concern:*

Be it known that I, ANDREW BROTT, a citizen of the United States, and a resident of Sidney, in the county of Cheyenne and State of Nebraska, have invented a certain new and useful Improvement in Beet-Harvesting Machines, of which the following is a specification.

My present invention relates generally to beet harvesting machines, and more particularly to one involving a beet topping apparatus, together with means for feeding the beets as they are dug from the ground to the topping arrangement, the latter being of such nature that the beets fed thereto will be cleanly and evenly topped, and discharged, in conjunction with the remainder of the harvesting machine which includes means for delivering the beets to the topping arrangement.

The object of my invention is to provide means whereby to generally improve and render more effective, the operation of removing the tops from the beets, to which end the particular topping arrangement and the particular means utilized to deliver the beets thereto, are highly important, as will be hereinafter pointed out.

In the accompanying drawings which illustrate my invention:

Figure 1 is a top plan view of the harvester;

Fig. 2 is a horizontal sectional view through one end portion of the topping arrangement, taken substantially on line 2—2 of Fig. 4;

Fig. 3 is a side elevation of the harvester;

Fig. 4 is a vertical longitudinal section taken substantially on line 4—4 of Fig. 1, and Fig. 5 is a vertical transverse section taken substantially on line 5—5 of Fig. 1.

Referring now to these figures, my improvements are mounted within, and portable with, a generally rectangular frame 10, supported in an elevated position upon forward and rear wheels 11 and 12 respectively, at the sides of the frame.

Centrally of its sides 13, the main frame 10 is provided with upstanding bearing brackets 14 in which are supported the ends of upper and lower transverse shafts 15 and 16, having thereon the sprockets of forward and rear parallel conveyers 17 and 18 respectively, inclined forwardly and downwardly in parallel relation, and the lower end of the rear conveyer 18 is adjustably attached to the lower portion of the forward conveyer 17, by slotted lower side arms 19, the lower end of the forward conveyer 17 being supported in like manner by slotted bracket arms 20 at the lower end thereof, connected as clearly seen in Figs. 1 and 3, to the forward portions of the frame side bars 13.

In use the harvester also carries a lower digging foot 21, which removes the beets from the ground in the first instance, and which with its connections (not shown), forms no part of my present invention.

The upper shaft 15 before described is also provided with a sprocket wheel 22 connected by a rearwardly extending sprocket chain 23, with the sprocket 24 of the rear axle 25, upon which the rear wheels 12 are secured, so that the traction of the frame in its movement serves to rotate the upper shaft 15, which latter, in addition to its sprocket 22, is provided with a side gear 26 in mesh with a similar gear 27 of the lower shaft 16, whereby the forward and rear conveyers 17 and 18 will be simultaneously rotated, in opposite direction, to carry the beets upwardly therebetween, engaged by their flights 28, for discharge from the upper rear end thereof.

Mounted with their ends in bearings 29 upon the opposite side frame bars 13, are a pair of shafts 30 and 31, the latter of which is provided with a sprocket wheel 32 connected by a sprocket chain 33 with a sprocket 34 of the rear axle 25, the shafts 30 and 31 having engaging gears 35 whereby to effect their simultaneous rotation.

Secured upon the shafts 30 and 31 is a pair of spirally grooved conical feed rollers 36, spaced slightly apart throughout their length, and disposed in view of the foregoing, rearwardly of the discharge ends of the conveyers 17 and 18 to receive the beets successively therefrom, the rotation of these feed rollers, together with their spacing and grooving, being such as to clutch the beet tops therebetween as the beets are fed laterally of the main frame, whereby to hold the beets themselves in the inverted position, as seen at the right in Fig. 4, this movement of the beets being assisted by the projecting pins 37 of an endless conveying member 38, the ends of which are extended around sprocket wheels 39 of vertical shafts 40 and 41, the latter of which is at one side of the small ends of the feed rollers 36, and is mounted within a bracket 42 and opposed to a similar vertical shaft 43 at the opposite side of the smaller ends of the feed rollers 36, horizontal disk knives 44 being mounted upon the upper ends of the shafts 41 and 43, with their edges overlapping in a vertical plane above the space between the feed rollers 36.

Each of the feed rollers 36 is provided at its smaller end, as seen in Fig. 2, with a worm 45 in mesh with a worm wheel 46 secured upon the adjacent shafts 41, 43, so that these latter shafts are not only simultaneously rotated to bring into effective operation their topping knives 44, but the shaft 41 is rotated further in order that such rotation may be communicated to the endless conveying member 38.

Thus it is apparent that, in operation, the beets upon removal from the ground, will be carried upwardly between the conveyers 17 and 18 and discharged upon the rollers 36 adjacent the larger ends of the latter, so as that the beets in their travel laterally on the rollers, will have their tops grasped between such rollers in order to hold the beets in inverted position with the assistance of the projecting fingers 37 of the endless conveying member 38, as before described, and provide for the holding of the beets in such position against the action of the topping knives 44, the relative rotation of which in their overlapping relation, results in the removal of the body of the beet from its top so held, so that the beets will be carried rearwardly by the upper of the two cutting disks, and the tops may be discharged between the rollers 36.

I have found in practice that a topping arrangement of the type thus fully described, is particularly effective for the purpose, in connection with a machine or apparatus, including means for feeding the beets to the feed rollers 36 and dropping the beets onto the same, and that I am enabled to remove the beet tops much more uniformly and readily than is possible with the beet harvesters of a somewhat similar type now in use.

I also preferably provide the conical feed rollers 36 with spiral grooves and the like 36ª, as best seen in Fig. 5, whereby to assist in the feeding movement of the beets, the length of the said feed rollers enabling the latter to obtain a firm uniform grip upon the beet tops carried along therebetween.

I claim:—

1. In a beet topping arrangement of the character described, the combination of a pair of horizontally disposed conical rollers, gradually tapering from one end to the other, and provided in their length with shallow spiral grooves, said rollers being mounted so that their inner faces are in uniformly parallel spaced relation to receive beet tops therebetween, means for delivering beets upon the upper larger ends of the rollers, means for rotating said rollers toward one another in relatively opposite directions whereby to pull the tops of the beets downward in their passage along the rollers, and thus support the beets in upright position, and horizontally disposed topping blades adjacent the smaller ends of the rollers for topping the beets so held in upright position.

2. In a beet topping arrangement of the character described, the combination of a pair of horizontally disposed conical rollers, gradually tapering from one end to the other, said rollers being so mounted that their inner faces are in uniformly parallel spaced relation to receive beet tops therebetween, means for delivering beets upon the upper larger ends of the rollers, means for rotating said rollers toward one another in relatively opposite directions whereby to pull the tops of the beets downward in their passage along the rollers and thus support the beets in upright position, horizontally disposed topping blades adjacent the smaller ends of the rollers for topping the beets so held in upright position, vertical shafts upon which the said topping blades are mounted and with which they are rotatable, one of said shafts having a sprocket wheel, and a chain mounted above one of the said rollers and extending at one end about the said sprocket wheel, said chain having laterally projecting arms in its length to engage and hold the beets in upright position, as they are topped.

3. In a topping apparatus, a pair of horizontally disposed tapering rollers having their inner adjacent faces in uniformly spaced relation and provided with worm wheels adjacent their smaller ends, means for rotating said rollers toward one another in relatively opposite directions, means for delivering beets from the larger ends of the rollers, a pair of vertical shafts adjacent the smaller ends of the rollers, worm wheels on the said shafts engaging the worms of the said rollers, one of said shafts having a sprocket wheel, a pair of horizontally disposed topping knives carried by the shaft, and a chain extending above one of the rollers and mounted at one end about the said sprocket wheel, said chain having laterally projecting arms engaging the beets supported by the rollers to hold the same in upright positions upon engagement with the topping knives.

ANDREW BROTT.

Witnesses:
C. L. MANN,
LESLIE NEUBAUER.

Copies of this patent may be obtained for five cents each, by addressing the "Commissioner of Patents, Washington, D. C."